Figure 14:
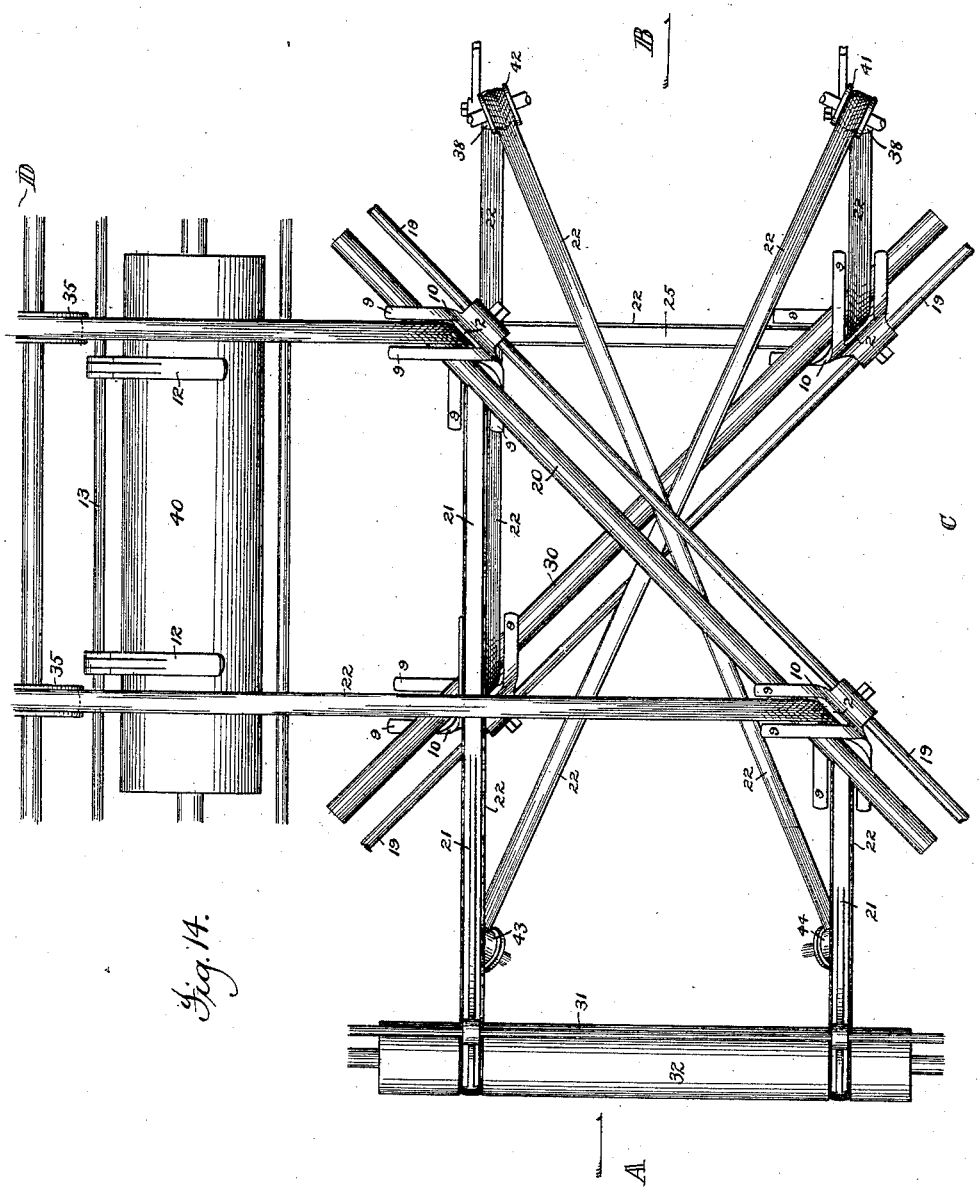

(No Model.)  6 Sheets—Sheet 1.
L. C. CROWELL.
WEB THREADING APPARATUS.
No. 331,283.  Patented Dec. 1, 1885.
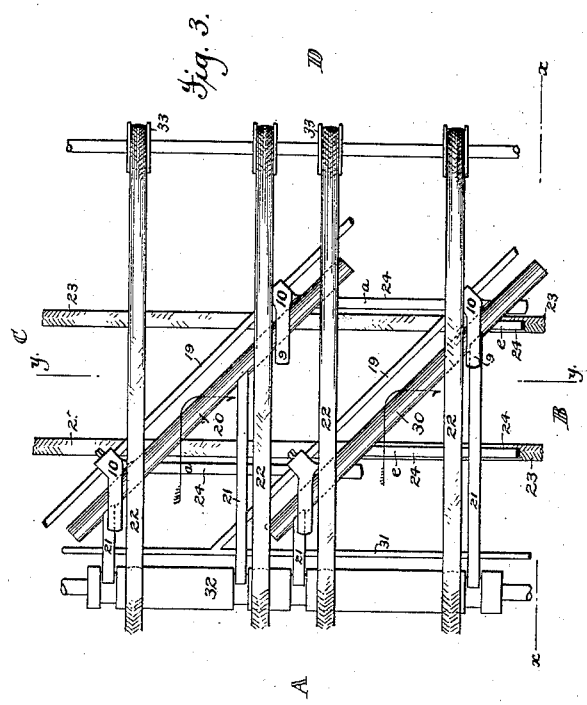
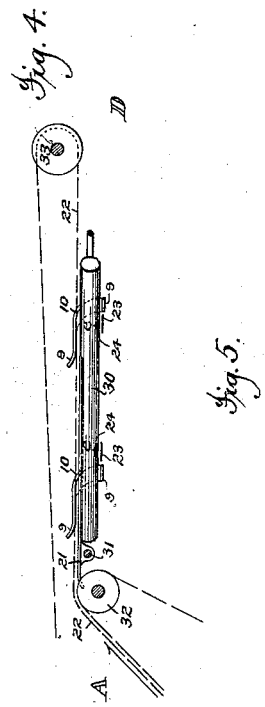
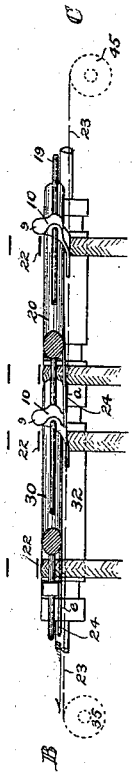
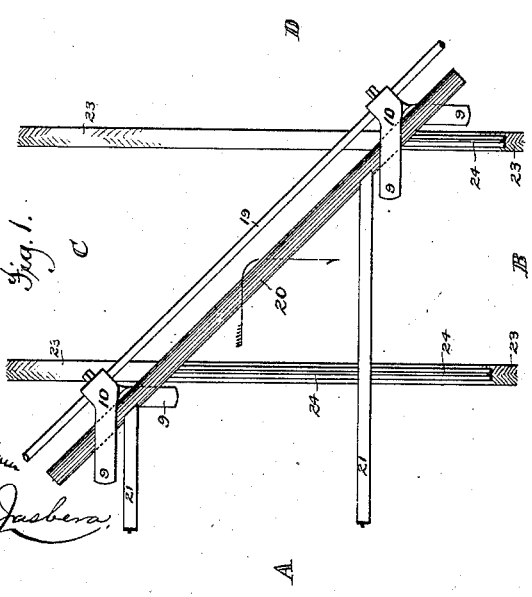
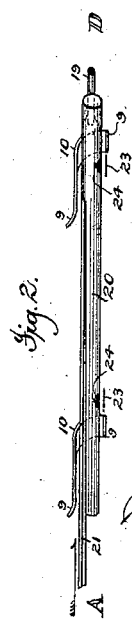
Attest:
G. W. Graham
A. N. Jasbera
Inventor:
Luther C. Crowell
by
Munson & Phelps
Attys.

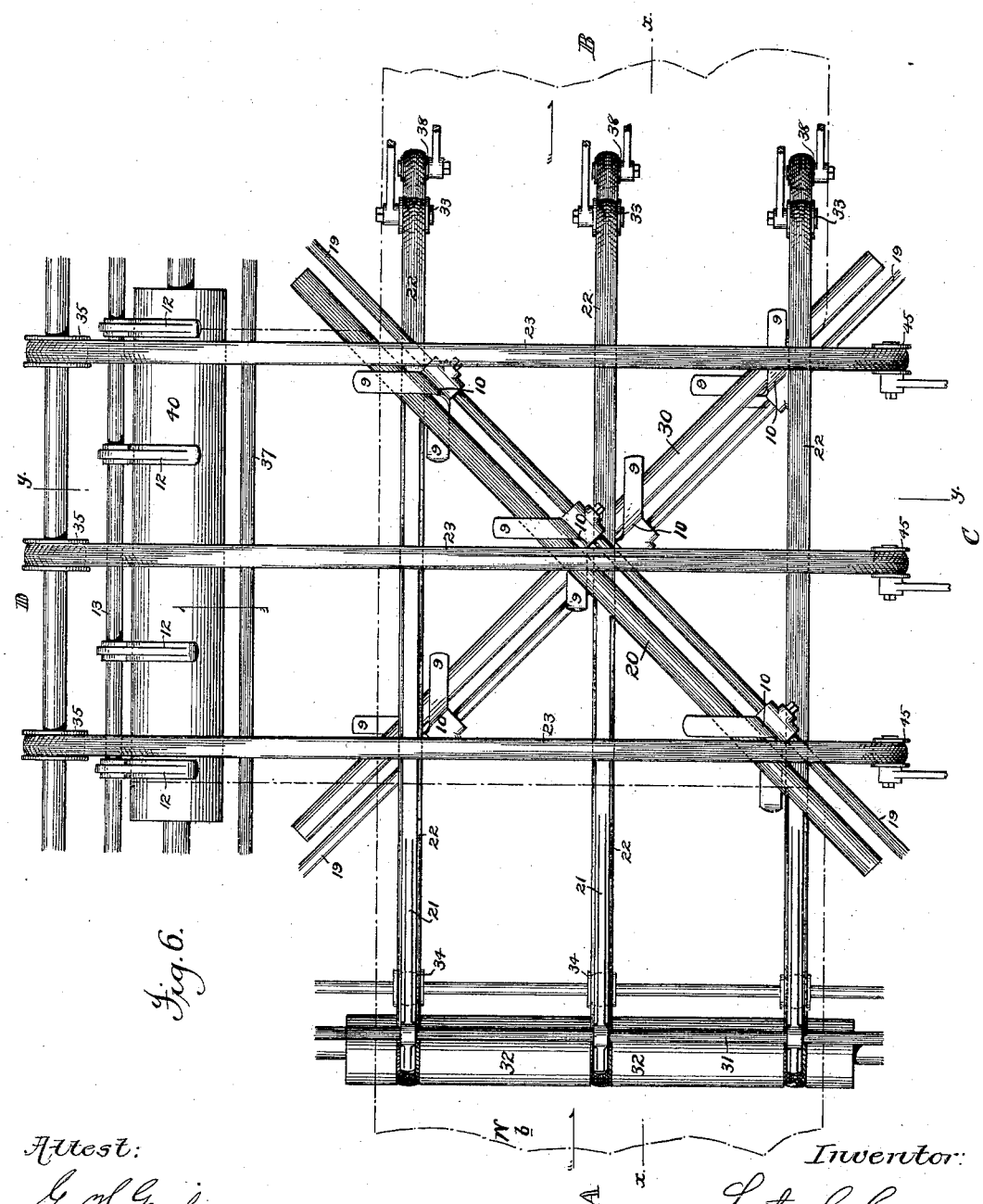

(No Model.) 6 Sheets—Sheet 3.
L. C. CROWELL.
WEB THREADING APPARATUS.
No. 331,283. Patented Dec. 1, 1885.
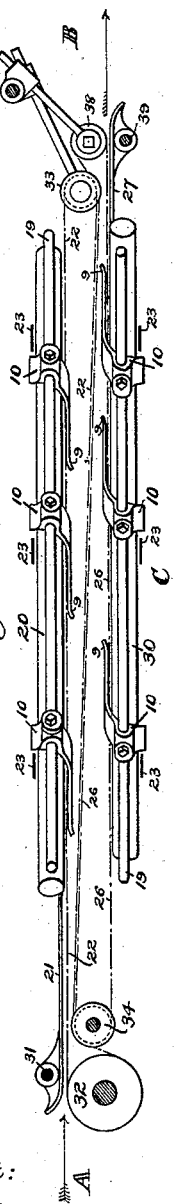
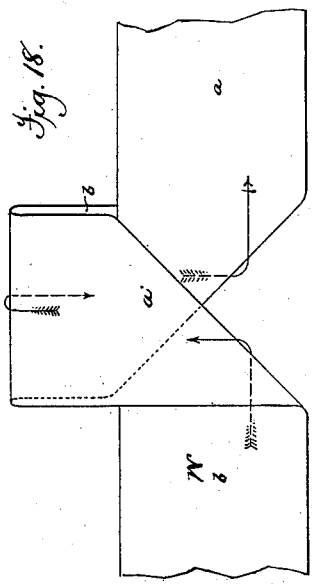
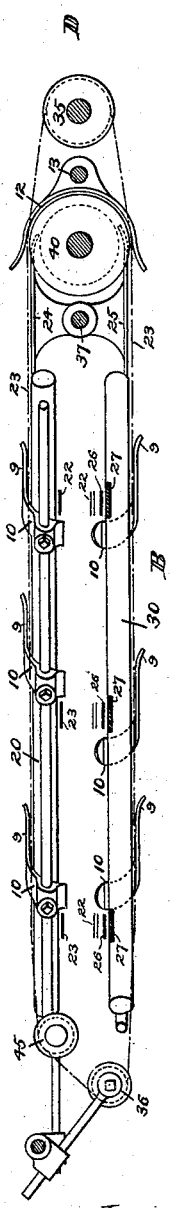

(No Model.) 6 Sheets—Sheet 4.
L. C. CROWELL.
WEB THREADING APPARATUS.
No. 331,283. Patented Dec. 1, 1885.
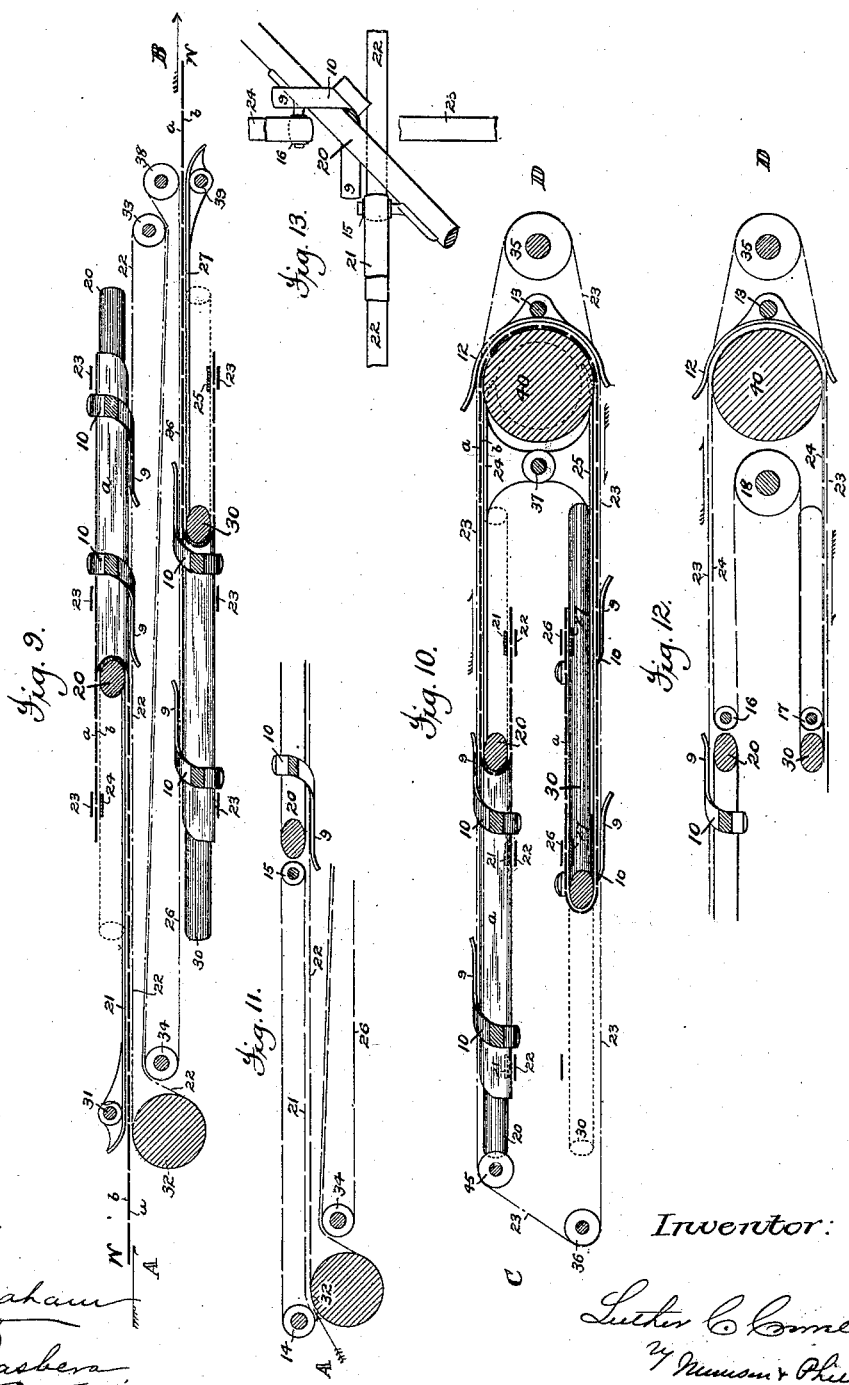
Attest:
Geo. H. Graham
A. L. Jasbera
Inventor:
Luther C. Crowell
by Munson & Philipp
Attys.

(No Model.)

L. C. CROWELL.
WEB THREADING APPARATUS.

No. 331,283. Patented Dec. 1, 1885.

6 Sheets—Sheet 5.

Attest:
Geo. H. Graham
A. N. Jasbera

Inventor:
Luther C. Crowell
by Munson & Philipp
Attys.

(No Model.) 6 Sheets—Sheet 6.

L. C. CROWELL.
WEB THREADING APPARATUS.

No. 331,283. Patented Dec. 1, 1885.

Attest:
Geo. H. Graham
A. N. Jasberg

Inventor:
Luther C. Crowell
by Munson & Philipp
Attys.

UNITED STATES PATENT OFFICE.

LUTHER C. CROWELL, OF BROOKLYN, ASSIGNOR TO R. HOE & CO., OF NEW YORK, N. Y.

WEB-THREADING APPARATUS.

SPECIFICATION forming part of Letters Patent No. 331,283, dated December 1, 1885.

Application filed June 17, 1885. Serial No. 168,924. (No model.)

*To all whom it may concern:*

Be it known that I, LUTHER C. CROWELL, a citizen of the United States, residing at Brooklyn, county of Kings and State of New York, have invented certain new and useful Improvements in Web-Threading Apparatus, fully described and represented in the following specification and the accompanying drawings, forming a part of the same.

This invention relates generally to web printing and delivery machines, and particularly to that class in which the web of paper is directed over turning devices to either change its direction of travel in entering the apparatus or in its path through the same, or to associate sections of the web after it has been printed when it is longitudinally divided, or to reverse the surfaces of the web, so that after one side thereof has been printed the unprinted side is presented to the "forms" to be printed. In either of these arrangements of turning devices it has been necessary, in starting the web of paper so that it will pass over the bars, either for the web to be temporarily attached to marginal threading-tapes in the manner now of common knowledge, or for the attendant to guide its entering or leading end and carry it properly around each bar, and also guide said end until it is under the positive control of the moving surfaces of the apparatus which may be adjacent to the bars; and as accidental breakages are liable to and do often occur in rear of the turning-bar, thus causing the web to choke up the machine by reason of a large length thereof accumulating at one point, and the lack of any means to carry forward the broken end, it necessitates handling the web, removing and destroying that portion that has caused the choke, and guiding its leading end over the bar or bars each time it so happens, and as this hand manipulation is a comparatively slow one, depending upon the position of the bar or bars, annoying delays ensue in the running of the apparatus.

It is the object of the present invention to obviate these difficulties; and to this end it consists, broadly, in combining with the bar or bars of the turning device a conductor or directing guide or guides suitably arranged with respect to the path of travel of the web, whereby the leading end of the web will be positively guided to and over the bar or bars in such manner that all hand manipulation thereof is dispensed with.

The invention also consists in the combination of such conductor or guide or guides with other conductors and said turning bar or bars, and in other combinations of devices too fully hereinafter set forth to need description here.

In the accompanying drawings, which will now be described, that side of the turning device at which the web enters is designated the "A" side, and that side at which it leaves is designated the "B" side, and the remaining two sides are designated the "C" and "D" sides, respectively.

Figure 15:
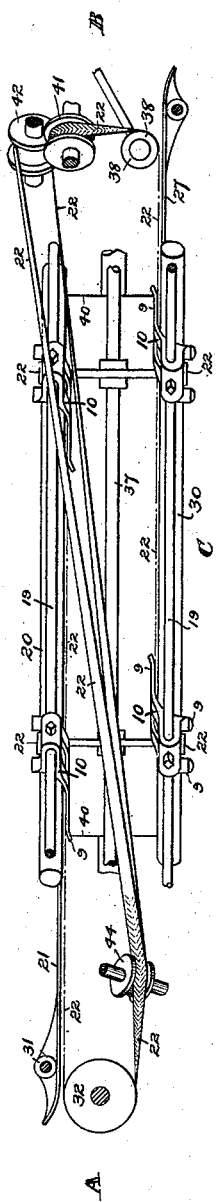
Figure 16:
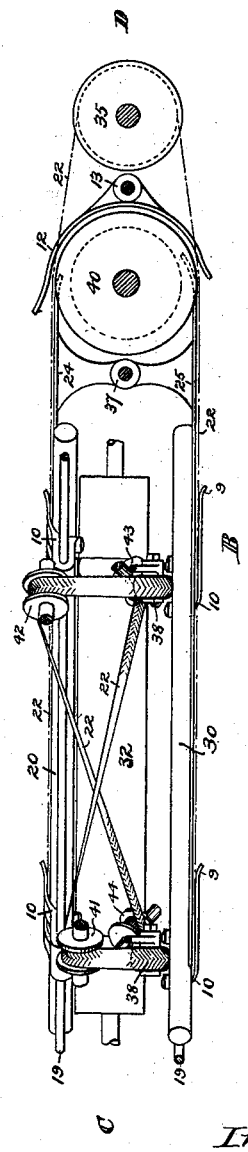
Figure 17:

In the drawings, Figure 1 is a plan view of a turning device for changing the direction of travel of a web provided with the present improvements, and Fig. 2 a side elevation of the same. Fig. 3 is a plan view of a turning device for associating a plurality of webs, and at the same time changing their direction of travel; and Figs. 4 and 5 are respectively sectional elevations of the same on the lines *x* and *y* thereof. Fig. 6 is a plan view of a turning device for reversing the surfaces of a web provided with this invention. Fig. 7 is a side elevation of the same, looking from the C side, and Fig. 8 a similar view, looking from the B side, of Fig. 6. Figs. 9 and 10 are sectional elevations of the same, taken on the lines *x* and *y*, respectively. Figs. 11 and 12 are sectional details showing a modified form of the conductors, and Fig. 13 a plan view of a portion of the same. Fig. 14 is a plan view of a modified form of the turning device for reversing the surfaces of a web. Figs. 15 and 16 are side elevations of the same, looking from the C and D sides, respectively; and Fig. 17 is a sectional detail of one of the guides and turning-bars, and Fig. 18 is a diagram illustrating the course of the web in passing through the turning device in reversing its surfaces.

In illustrating the several embodiments of this invention the printing and delivery apparatus have been omitted, as the use of a turning-bar for changing the path of travel of a web, the use of turning-bars in associating two or more longitudinal sections or narrow webs, and their use combined with the bending-roller in reversing the surfaces of a web of paper, and their arrangement and connection with such apparatus are now of common knowledge.

Letters Patent describing and illustrating different forms of apparatus in connection with which turning-bars have been used for the various purposes described herein will, however, be referred to hereinafter, in order to aid in a more ready understanding thereof.

Referring to Figs. 1 and 2, the turning device is illustrated in its simplest and well-known form, and consists of a bar, 20, that is arranged angularly across the path of travel of the web, so that in passing around it the web is directed in a path at an angle to its previous path of travel. There are many examples in which turning-bars have been thus arranged. In Letters Patent No. 255,723 turning-bars are illustrated as angularly disposed with respect to two printing-cylinders, and their companion impression-cylinders arranged at right angles one with the other in the path of travel of the web, so as to direct the webs from one printing-cylinder to the other. In Letters Patent No. 269,021 a turning-bar is shown as arranged in the path of travel of the web, so as to direct it from the last impression-cylinder to a delivery apparatus, the axes of which are at right angles to the impression-cylinder; and in Letters Patent No. 269,185 a similar turning-bar is illustrated as arranged between the roll of paper and certain feeding-rolls disposed at right angles to the axis of the paper roll, so as to properly direct the passage of the web to said feeding-rolls. In either of these examples the turning-bar 20 is fixedly secured to brackets (not shown) secured to the frame-work of the apparatus, which brackets may be capable of slight adjustment thereon or not, as may be deemed necessary. This turning-bar is provided with one or more suitably-curved guides, 10, whose inner curved surface coincides with the surface of the bar, and is situated a slight distance therefrom and held in such position upon a supporting-rod, 19, that passes through bosses provided on the guides, and to which bar they are secured by set-screws, as is clearly shown. The ends 9 of these curved guides may extend over and under the bar to any extent desired, so as to aid in directing the leading end of the web to and from the bar, and their entering ends may be suitably curved, so as to present curved ends to the entering web, as is obvious. It may also be remarked that the curved guides, instead of being of narrow widthwise dimensions, might be of a width equal to the length of the turning-surface of the bar. Associated with these curved guides 10 are arranged web-conductors 21, consisting of two or more metal guides secured at one end to the inner surface of the turning-bar and at the other end to a cross-bar (not shown) supported in the frame-work, which conductors serve, in this instance, as under or supporting guides for the web of paper, and bridge the space from a supporting-roll or other surface to the turning-bar. There are also provided a set of guides, 24, similar to those just described, and supported in like manner, which serve as upper guides for the web of paper and extend over the space from the under surface of the bar 20 to a roll or rollers or other surface to which the web is to be directed. While the ends of the curved guides 10 might be extended a sufficient distance to bridge the space from the under surface of the bar to said roll or rollers, two or more moving conductors, 23, are preferably provided, stretched from pulleys, (not shown,) so that as the leading end of the web arrives at the under side of the bar, having been carried into such position by the aid of said curved guides 10, it will be brought in contact with the moving conductors 23 and be carried thereby from the bar in the proper direction to be operated upon by the adjacent devices of the apparatus; or these conductors 23 might be margin threading-tapes passing through a portion of the apparatus, to which the leading end of the web may be temporarily attached, and be thus carried onward with them. It may also be observed that in like manner moving conductors might be provided to carry the webs over the guides 21 to the turning-bar, so that its entering end will be positively carried thereto, and, meeting the curved guides 10, be guided or caused to leave said conductors and follow the turning-surface of the bar and be turned over it, so as to meet the under moving conductors, 23.

Figs. 3, 4, and 5 illustrate an arrangement of turning devices provided with the present improvements for associating two sections of a web longitudinally divided or two separate webs, so as to superimpose one section or web upon the other and change their direction of travel. Turning-bars arranged for this purpose are illustrated in Letters Patent No. 317,741, and are fully described therein, and need no extended description herein. In said figures the turning device consists of two turning-bars, 20 30, arranged parallel with each other, and angularly disposed across the path of travel of the web. Each of these bars is provided with the curved guides 10, supported upon cross-bars 19 in proper relation with the turning-surface of the turning-bars, with under supporting-guides 21 bridging the space from a roll, 32, to the turning-bars, and with upper co-operating moving conductors, 22, stretched so as to run in contact with said roll 32 over the surface of the turning-bars 20 30 and return around pulleys 33, and operating to carry the web over said guides 21 from the roll 32 to the turning-bars, and with stationary guides 24 and moving conductors 23, stretched from pulleys 35 45, forming the conductors from the under side of the turning-bars to the pulleys 35. The guides 24 in this instance are made in two portions, the portion *a* extending from the inner under surface of the bar 20 to and connecting with each of the curved guides 10, associated with the turning-bar 30, and thus bridge the space from one bar to the under side of the other. The other portion, *e*, of the guides 24 extends from the turning-bar 30 to the pulleys 35, as is clearly shown in Fig. 5. The leading ends of the webs to be associated (should they be a single web in the first instance it will be divided longitudinally by a suitable slitter, which might be arranged to cooperate with the roll 32) will be carried by the moving conductors 22 over the supporting-guides 21 to the upper surface of the turning-bars 20 30, where, meeting the curved guides 10, they will be directed by them from the moving conductors 22, so as to follow and turn over the turning-bars. The web turned over the bar 30 will be directed under it into contact with the moving conductors 23, and be carried thereby between them and the portion *e* of the stationary guides 24. The web turned over the turning-bar 20 will in like manner be directed under it into contact with the moving conductors 23, and be carried thereby between them and the portion *a* of the stationary guides 24, and be directed by said guides and the lower extending portion of the curved guides 10 of the bar 30 under the web turned over said bar, and, meeting the same, the webs thus associated will be carried together by said moving conductors 23 over the pulleys 35, in position to be further manipulated.

In the embodiment of the invention shown in Figs. 6 to 17, inclusive, the curved guides and conductors are illustrated as combined with turning-bars arranged to reverse the surfaces of a web. Such an arrangement of bars is fully shown and described in Letters Patent No. 212,444, and therefore needs no extended description here.

Referring particularly to Figs. 6 to 10, inclusive, the turning-bars 20 30 are angularly arranged across the path of travel of the web and disposed in opposite directions with each other and situated a short distance apart one over the other. Arranged with these turning-bars is a bending-roll, 40, around which the web is turned after passing from the first turning-bar, so as to be directed back to the second turning-bar, as is common. Each of these turning-bars is provided with a number (three, as shown in the present case) of curved guides 10, supported and held in proper relation with the surface of the turning-bars by the supporting-bars 19, as before described. The passage of the web over the turning-bars is in this instance from their under side over to the upper side of them, as distinguished from the embodiments before described, wherein the passage of the web is reversed—that is, from the upper side of the bar or bars over to its or their under side. The upper turning-bar, 20, herein is, in like manner, provided with the stationary guides 21, which are supported at one end upon a cross-bar, 31, and at the other fixed to the inner side of the turning-bar, and with moving conductors 22, stretched from a roll, 32, to and return around stretching-pulleys 33, over pulleys 34, and passing in contact with the under surface of said turning-bar. These guides and conductors in this illustration are the reverse of those before described, the latter serving as supporting-conductors for the web from the roll 32 to the under side of the turning-bar 20. The leading end of the web will be carried thereby to the under surface of said turning-bar, when it will be directed and turned upwardly around the same by the curved guides 10, by which the web will be directed at an angle to its previous path of travel toward the bending-roll 40. The space between this turning-bar 20 and said bending-roll is bridged by stationary supporting-guides 24, supported similar to the guides 21 upon a cross-bar, 37, with which guides 24 are provided moving conductors 23, which are stretched from pulleys 45, passing in contact with the upper surface of the turning-bar 20 and bending-roll 40, and return around pulleys 35 in contact with the under surface of said bending-roll, and the turning-bar 30, around stretching-pulleys 36. The leading end of the web, turned around the turning-bar 20 to its upper surface, will be carried onward by the moving-conductors 23 over the guides 24 to the bending-roll 40, where the leading end of the web will be directed around it by fixed guides 12, supported from a cross-bar, 13, in close relation with said roll 40, and be carried and directed thereby to the under side of said roll into contact with the moving conductors 23, and will be carried thereby under stationary guides 25, supported and arranged upon the cross-bar 37, in a manner similar to the guides 24, to the under side of the turning-bar 30. The leading end of the web thus carried will meet the curved guides 10, arranged with said turning-bar, and be directed thereby from the under side of said bar upwardly around the same to its upper surface, and be thus turned so as to travel at an angle to its path of travel from the bending-roll 40, and in the same direction as its travel to the turning-bar 20, with its surface reversed, as will be seen clearly in Fig. 18, wherein the web W, traveling toward the turning-bar 20, with its B side uppermost, has its surface reversed, so that its A side is uppermost in leaving the turning-bar 30. In being directed over the turning-bar 30 by the curved guides the leading end of the web will be carried onward from said bar by moving conductors 26 over stationary guides 27 into such position as to be further operated upon. These moving conductors 26 are stretched from the pulleys 34, passing in contact with the upper surface of the turning-bar 30, and return around stretching-pulleys 38 under the pulleys 33, and the stationary guides 27 are supported, in like manner as the guides 21, upon a crossbar, 39.

The stationary guides leading to and from the turning-bars may have substituted for them moving conductors, which will be so arranged as to co-operate with the moving conductors 22, 23, and 26, to carry the leading end of the web positively to and from the turning-bars. Sectional details of such substitution are illustrated by Figs. 11, 12, and 13, wherein the stationary guide 21 of the previously-described embodiments is represented by moving conductors 21, that are stretched around pulleys 14 15, (see Figs. 10, 12,) so as to co-operate with the lower moving conductors, 22. The pulleys 15, in this instance, will be suitably mounted on brackets secured to the inner side of the turning-bar 20, as is clearly shown.

The stationary guides 24 25, heretofore described as bridging the space from the turning-bar 20 to the bending-roll 40, and from the latter to the turning-bar 30, are replaced by continuous moving conductors 24, (see Fig. 12,) which are stretched from pulleys 16 (mounted on brackets similarly secured to the turning-bar 20 as are the brackets supporting the pulleys 15) around the bending-roll 40, to and around pulleys 17, similarly mounted to the turning-bar 30 as are the pulleys 15 16, and return around pulleys 18. These moving conductors 24 thus co-operate with the moving conductors 23 in positively carrying the leading end of the web from the turning-bar 20 around the bending-roll 40 to the turning-bar 30. In like manner as the stationary guides 21 are substituted by the moving conductors, (shown in Fig. 11,) the stationary guides 27 may have substituted for them moving conductors co-operating with the moving conductors 26, so as to positively carry the leading end of the web, after being turned over the bar 30, to the adjacent operating devices of the apparatus.

In the modified arrangement illustrated by Figs. 14 to 17, inclusive, the sets of moving conductors 23 and 26 are dispensed with, and the moving conductors 22 are stretched so as to travel through the entire turning device, and thus carry the leading end of the web over the turning-bars and bending-roll out of the device, and thence return to the place of entrance to the turning device.

The curved directing-guides 10, associated with each turning-bar, are provided with openings 2, through which the conductor 22 passes, and which provides supports 3, (see Fig. 17,) by which the conductor is held out of contact with the bars, except at their upper and lower surfaces, as its direction is changed in passing around them. By this means the web is prevented from buckling or being caused to slew to one side in turning the bars. The extensions 9 of the guides 10 will in this case be preferably of the duplex form shown, so arranged as to lie upon opposite sides of the conductor 22, as shown in Fig. 14. In this construction of the curved guides the continuous moving conductors 22 will be stretched from the roll 32 to and in contact with the under surface of the turning-bars 20, thence through the openings 2 around the supports 3 of the curved guides, thence over and in contact with the upper surface of said turning-bar to and in contact with the upper surface of the bending-roll 40, thence around pulleys 35 under and in contact with the under surface of said bending-roll to and in contact with the under surface of the turning-bar 30, and through the openings 2 over the supports 3 of the curved guides arranged with said bar, thence over and in contact with the upper surface thereof, thence around stretching-pulleys 38 and over diagonally-arranged pulleys 41 42, thence crossing each other and returning under similar pulleys, 43 44, to said roll 32. The position of these diagonally-arranged pulleys is such that the moving conductors will be properly returned, after passing through the turning device, by being directed diagonally across each other's path in the space between the planes in which the two turning-bars are placed from the point at which they cease to carry the web back to the point at which they act to do so. With these continuous moving conductors may be arranged the stationary guides or co-operating moving conductors 21, 24, 25, and 27, in the manner before described.

The continuous conductors 22 (illustrated in Figs. 14 to 17) may be marginal or threading tapes running entirely through the printing apparatus, by which the leading end of the web may be suitably directed over the impression cylinder or cylinders, to be printed upon one side and through the turning device, thus reversing its sides, and onto the remaining impression cylinder or cylinders, to be printed upon the opposite side, from which last cylinder the tapes may be returned back to the first impression-cylinder.

The marginal tapes of the conductors 22 of the embodiment illustrated in Figs. 6 to 13 may be the marginal or threading tapes passing over the impression cylinder or cylinders through which the web is printed on one side, and after passing under the turning-bar 20 may be returned directly over the pulleys 33 34 to the first impression-cylinder. In like manner the marginal tapes of the conductors 26 may, after passing the pulley 38, be led to and over the impression cylinder or cylinders by which the reversed web is printed upon its opposite side and return from the last impression-cylinder under pulleys 33 to the pulleys 34. In this arrangement, however, the leading end of the web, if attached to the marginal tapes 22 on entering upon the first impression-cylinder, would necessarily have to be detached upon entering the turning device and be attached to the marginal tapes of the conductors 26 after passing through the turning device, to be directed and carried around the last impression-cylinder, as will be readily understood, from which it will be seen that the particular arrangement of the moving conductors herein shown may be varied, as circumstances and the form of the printing apparatus and adjacent operating devices may require.

While in the web-reversing apparatus it is preferable to lead the moving conductors around the pulleys 35, as the web would thus be less liable to buckle in passing around the bending-roll 40, said conductors might be passed around said roll, and thus dispense with the guides 12, as is obvious.

It is obvious that either or both of the lateral extending portions 9 of the guides 10 may be of a length sufficient to guide the web for a distance to or from the turning-bar, and thus in some instances dispense with the employment of other conductors for the leading end of the web. Thus in the embodiment shown in Figs. 1 and 2 the under lateral extending portion 9 of the curved guides might bridge the space from the turning-bar to an adjacent moving surface or carrying-tapes of the apparatus, and thus dispense with the moving conductors 23. The stationary guides 24 might also in such case be formed of moving conductors mounted in the manner before described, and stretched around the adjacent moving surface, or co-operate with other carrying-tapes.

While the various embodiments of this invention as herein described are thought sufficient to clearly illustrate all the forms in which they may be used, it is to be understood that the curved directing-guides, the moving conductors, and the stationary guides may be employed with many other forms of web-turning devices not herein specifically referred to, which are now of common knowledge. The curved directing-guides, either with or without the moving conductors, or the stationary guides may be used—for instance, with the V form of turning device, wherein the web is transferred laterally without changing its direction of travel, as illustrated in Letters Patent No. 181,250, and many others subsequent thereto.

In like manner these improvements may be employed with turning devices consisting of bars arranged parallel with one another so as to transfer a plurality of webs laterally without changing their direction of travel, as illustrated in Letters Patent No. 255,723, before referred to.

What I claim is—

1. The combination, with a turning-bar, of a curved directing guide or guides, 10, substantially as described.

2. The combination, with a turning-bar, as 20, provided with conductors for carrying the leading end of a web to and from said bar, of a curved directing guide or guides, 10, substantially as described.

3. The combination, with a turning-bar, with which is provided a moving conductor or conductors for carrying the leading end of a web to or from said turning-bar, of a curved directing guide or guides, 10, substantially as described.

4. The combination, with a turning-bar, with which is provided a continuous traveling conductor or conductors for carrying the leading end of the web to, over, and from said turning-bar, of a curved directing guide or guides, 10, substantially as described.

5. The combination, with a turning-bar, with which is provided a continuous moving conductor or conductors for carrying the leading end of the web to, over, and from said turning-bar, of a curved directing guide or guides, 10, provided with the opening 2 and distending support 3, substantially as described.

6. The combination, with the turning-bars 20 30 and the roll 40, arranged to reverse a web, of the curved directing-guides 10 12, and suitable conductors for carrying the web through the reversing apparatus, substantially as described.

7. The combination, with the turning-bars 20 30 and the roll 40, arranged to reverse a web, of the curved directing-guides 10 12 and suitable conductors for carrying the web through the reversing apparatus, said conductors passing around pulleys 35, arranged outside the roll 40, substantially as described.

8. The combination, with the turning-bars 20 30, having the curved guides 10, of the moving conductors 23, passing under said bars, and the stationary guides 24, arranged to co-operate with the conductors 23, substantially as described.

9. The combination, with the turning-bars 20 30, having the curved guides, 10, of the upper conductors and guides, 22 21, the moving conductors 23, passing under said bars, and the stationary guides 24, arranged to co-operate with the conductors 23, substantially as described.

In testimony whereof I have hereunto set my hand in the presence of two subscribing witnesses.

LUTHER C. CROWELL.

Witnesses:
GEO. H. GRAHAM,
JAS. J. KENNEDY.